US012397842B2

(12) United States Patent
Zhang

(10) Patent No.: US 12,397,842 B2
(45) Date of Patent: Aug. 26, 2025

(54) FOLDABLE CHILD CARRIER

(71) Applicant: WONDERLAND SWITZERLAND AG, Steinhausen (CH)

(72) Inventor: Xiaojian Zhang, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 88 days.

(21) Appl. No.: 18/250,319

(22) PCT Filed: Oct. 22, 2021

(86) PCT No.: PCT/EP2021/079381
§ 371 (c)(1),
(2) Date: Apr. 24, 2023

(87) PCT Pub. No.: WO2022/084521
PCT Pub. Date: Apr. 28, 2022

(65) Prior Publication Data
US 2023/0406389 A1 Dec. 21, 2023

(30) Foreign Application Priority Data
Oct. 23, 2020 (CN) .......................... 202011145689.9

(51) Int. Cl.
*B62B 7/14* (2006.01)
*B62B 7/06* (2006.01)
*B62B 9/08* (2006.01)

(52) U.S. Cl.
CPC ................ *B62B 7/142* (2013.01); *B62B 7/06* (2013.01); *B62B 9/08* (2013.01); *B62B 2205/20* (2013.01)

(58) Field of Classification Search
CPC .. B62B 7/142; B62B 7/14; B62B 7/06; B62B 9/08; B62B 2205/20
See application file for complete search history.

(56) References Cited

U.S. PATENT DOCUMENTS 8,491,000 B2 * 7/2013 Yeh .......................... B62B 7/142
280/647
9,260,128 B2 * 2/2016 Liu .......................... B62B 7/147
(Continued)

FOREIGN PATENT DOCUMENTS

CN     101954922 A    1/2011
CN     203651858 U    6/2014
(Continued)

OTHER PUBLICATIONS

International Search Report issued in corresponding International Application No. PCT/EP2021/079381, dated Jan. 5, 2022, pp. 1-2, European Patent Office, Rijswijk, Netherlands.
(Continued)

*Primary Examiner* — John D Walters
(74) *Attorney, Agent, or Firm* — HAUPTMAN HAM, LLP

(57) ABSTRACT

A foldable child carrier includes a seat portion pivotally connected to a stroller frame and a back-resting portion in a folded configuration relative to the seat portion; a lock mechanism between the seat portion and the stroller frame to lock up the position of the seat portion relative to the stroller frame; a movable actuator member between the seat portion and the back-resting portion; the actuator member being unable to release the lock mechanism when the back-resting portion is in a reclined position; and the movement of the actuator member allowing the lock mechanism to release the seat portion and the stroller frame when the back-resting portion is in a folded position, so that the seat portion can rotate relative to the stroller frame. The foldable child carrier of the present disclosure has at least such features as novel structure, user-friendliness, safety and liability, and easy portability and storage.

22 Claims, 12 Drawing Sheets

(56) References Cited

U.S. PATENT DOCUMENTS

2015/0076795 A1    3/2015  Liu
2019/0322304 A1*   10/2019 Zhong ..................... B62B 7/145

FOREIGN PATENT DOCUMENTS

| | | | |
|---|---|---|---|
| CN | 104553902 A | 4/2015 | |
| CN | 207106588 U | 3/2018 | |
| CN | 108556896 A | 9/2018 | |
| CN | 208855702 U | 5/2019 | |
| CN | 110386183 A | 10/2019 | |
| CN | 111483503 A | 8/2020 | |
| EP | 2275321 A2 | 1/2011 | |
| GB | 2566816 A | 3/2019 | |
| TW | 201522122 A | 6/2015 | |
| WO | WO-2010050804 A1 * | 5/2010 | ............. B62B 7/123 |
| WO | 2019054863 A1 | 3/2019 | |
| WO | 2019054863 A2 | 3/2019 | |

OTHER PUBLICATIONS

Taiwan First Office Action issued in corresponding Taiwan Application No. TW110138671, pp. 1-9.
Taiwan First Office Action issued in corresponding Taiwan Application No. 112110871, dated Aug. 21, 2023, pp. 1-8.
Chinese First Office Action issued in corresponding Chinese Application No. 2020111456899, dated Mar. 27, 2024, pp. 1-15.
Notice of Grant in Corresponding Chinese Application No. 202011145689.9, dated Jan. 27, 2025; 6 pgs.

* cited by examiner

FOLDABLE CHILD CARRIER

CROSS-REFERENCE TO RELATED APPLICATIONS

This application is a U.S. National Stage of International Application No PCT/EP2021/079381, filed on Oct. 22, 2021, which claims priority to Chinese Application No. 202011145689.9, filed on Oct. 23, 2020, which is incorporated herein by reference in its entirety.

TECHNICAL FIELD

The present disclosure relates to infant products. More specifically, the present disclosure relates to a foldable child carrier.

BACKGROUND

Infant strollers are the part and parcel of infant products. Infant strollers generally include a stroller frame and a seat portion on the stroller frame. An infant seat portion is primarily fixedly joined to and inseparable from a stroller frame, making sanitation and reuse of the seat portion inconvenient. While some models have the feature of infant seat portions being detachable from the stroller frame, they nevertheless require deconstruction and convertibility in the outdoors given their relatively bigger size, and such assembling and disassembling could bring inconvenience to the journey.

SUMMARY

The present disclosure is to provide a foldable child carrier that allows a folded seat portion to rotate relative to a stroller frame.

In an embodiment, the present disclosure provides a foldable child carrier including a seat portion pivotally connected to a stroller frame and a back-resting portion in a folded configuration relative to the seat portion; a lock mechanism being disposed between the seat portion and the stroller frame to lock up the position of the seat portion relative to the stroller frame; a movable actuator member being disposed between the seat portion and the back-resting portion; the actuator member being unable to release the lock mechanism when the back-resting portion is in a reclined position; and movement of the actuator member allowing the lock mechanism to release the seat portion and the stroller frame when the back-resting portion is in a folded position, so that the seat portion can rotate relative to the stroller frame.

In an embodiment, the foldable child carrier of the present disclosure includes a stroller frame, a seat portion, and a back-resting portion in a folded configuration on the seat portion, wherein the seat portion is pivotally connected to the stroller frame, and the back-resting portion is foldable relative to the seat portion. A lock mechanism is disposed between the seat portion and the stroller frame, and an actuator member to actuate the lock mechanism is disposed between the back-resting portion and the seat portion. When the back-resting portion is in a reclined position, the actuator member is unable to release the lock mechanism. When the back-resting portion is in a folded position, movement of the actuator member can allow the lock mechanism to release the seat portion and the stroller frame, so that the seat portion can rotate relative to the stroller frame. The foldable child carrier of the present disclosure propels the actuator member of the lock mechanism to act on and lock up the mechanism only when the back-resting portion is in a folded position, effectively preventing misusage of the child carrier, and making the child carrier more safe and reliable. The foldable child carrier of the present disclosure can release the lock mechanism via movement of the actuator member when the back-resting portion is folded relative to the seat portion, so that the seat portion can be unlocked and released from the stroller frame, and eventually the seat portion can rotate relative to the stroller frame to adjust the position of the seat portion relative to the stroller frame, allowing the child carrier to have a smaller size and easier portability and storage. The foldable child carrier of the present disclosure has such features as novel structure, user-friendliness, safety and liability, and easy portability and storage.

In an embodiment, the back-resting portion is connected to a first fixed base, and the seat portion is connected to a second fixed base; the first fixed base is rotatable relative to the second fixed base when the back-resting is folded.

In an embodiment, an actuator member is installed on the first fixed base.

In an embodiment, the actuator member is rotatably disposed on the first fixed base.

In an embodiment, the lock mechanism includes a lock member that is movably disposed on the second fixed base.

In an embodiment, the foldable child carrier includes a positioning member cooperating with the stroller frame, and the positioning member allows the seat portion to engage with the stroller frame; the lock member cooperates with the positioning member to lock up the position of the seat portion relative to the positioning member; the actuator member moves to release the lock member from the positioning member, so that the seat portion is rotatable relative to the stroller frame or positioning member.

In an embodiment, a driving member is disposed between the actuator member and the lock member, and the driving member is connected to the lock member and disposed on the moving path of the actuator member, which moves to allow the driving member to trigger movement of the lock member.

In an embodiment, the driving member is movably disposed between the first fixed base and the actuator member.

In an embodiment, an actuator portion cooperating with the driving member is disposed on the actuator member, and the driving member is disposed on the moving path of the actuator portion.

In an embodiment, the actuator portion is an actuating inclined surface, and the actuator member moves to allow the actuating inclined surface to jack up the driving member, so that the driving member triggers the lock member to move and depart from the lock position.

In an embodiment, one end of the actuating inclined surface is configured to have a flat straight portion for the driving member to stay, and when the driving member is jacked up to the flat straight portion by the actuating inclined surface, displacement of the lock member is sufficient for the lock member to depart from the lock position and release the lock.

In an embodiment, an arch-shaped slot for penetrating through the lock member is disposed on the first fixed base, and the lock member is at a different location of the arch-shaped slot when the first fixed base rotates relative to the second fixed base.

In an embodiment, a first restraint member to restrict rotation of the actuator member in the first direction is disposed on the first fixed base, and a first restraint portion cooperating with the first restraint member is disposed on the actuator member.

In an embodiment, a second restraint member to restrict rotation of the actuator member in the second direction is disposed on the first fixed base, and a second restraint portion cooperating with the second restraint member is disposed on the actuator member.

In an embodiment, an installation portion cooperating with the driving member is disposed on the lock member.

In an embodiment, the installation portion is a through hole for installation of the driving member therein.

In an embodiment, a first return member to keep the actuator member in a consistently returning state is disposed on the actuator member.

In an embodiment, the first return member is a tension spring.

In an embodiment, a second return member to keep the lock member in a constantly returning state is disposed on the lock member.

In an embodiment, the second return member is of a tension spring structure.

In an embodiment, the lock member has a lock portion, protruding from the second fixed base, formed on an end away from the driving member, and the positioning member has a positioning portion disposed thereon for cooperating with the lock portion.

In an embodiment, the actuator member is connected to an operation member to propel the actuator member.

In an embodiment, the operation member is of a flexible structure.

DETAILED DESCRIPTION

Figure 1:
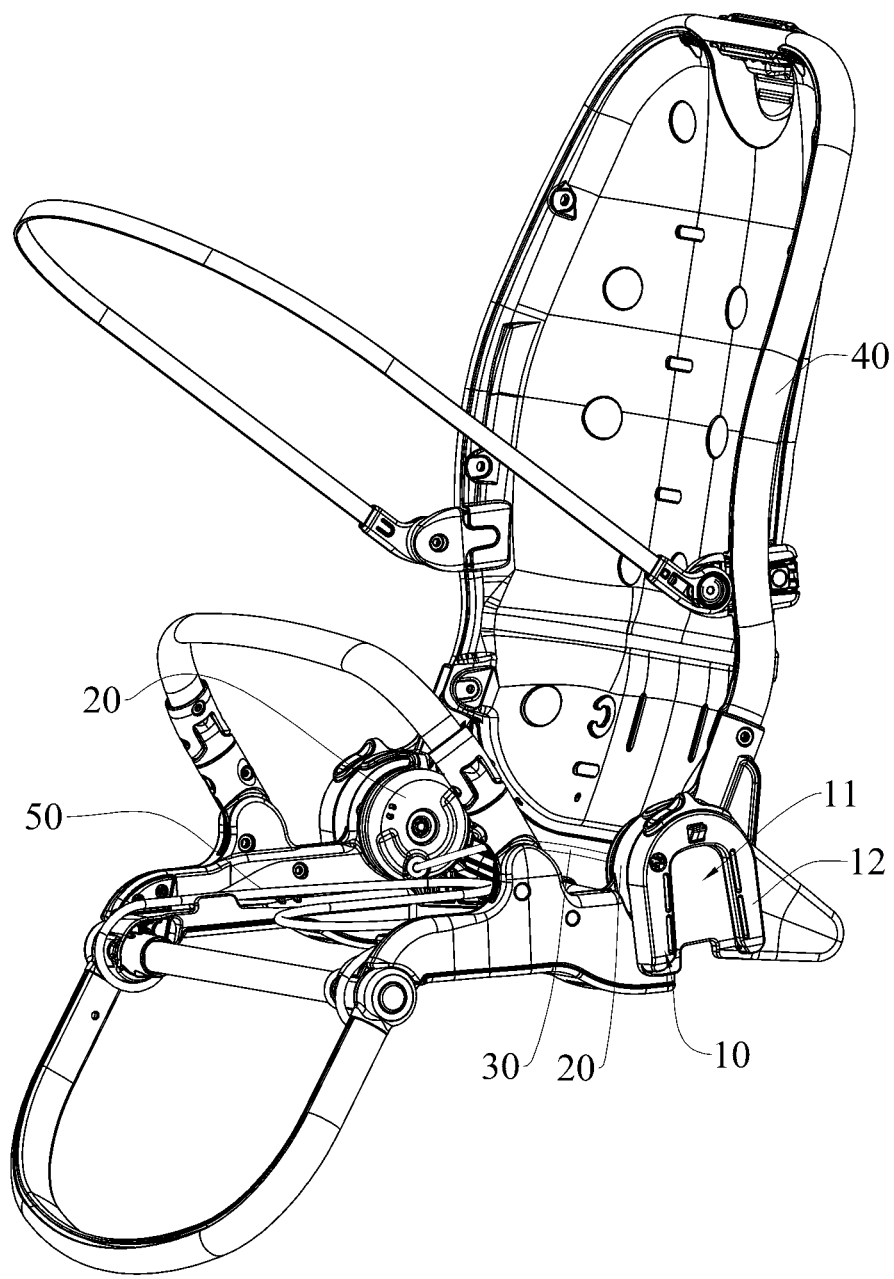
FIG. 1 is a structural schematic view of the seat portion according to an embodiment of the present disclosure.
Figure 2:
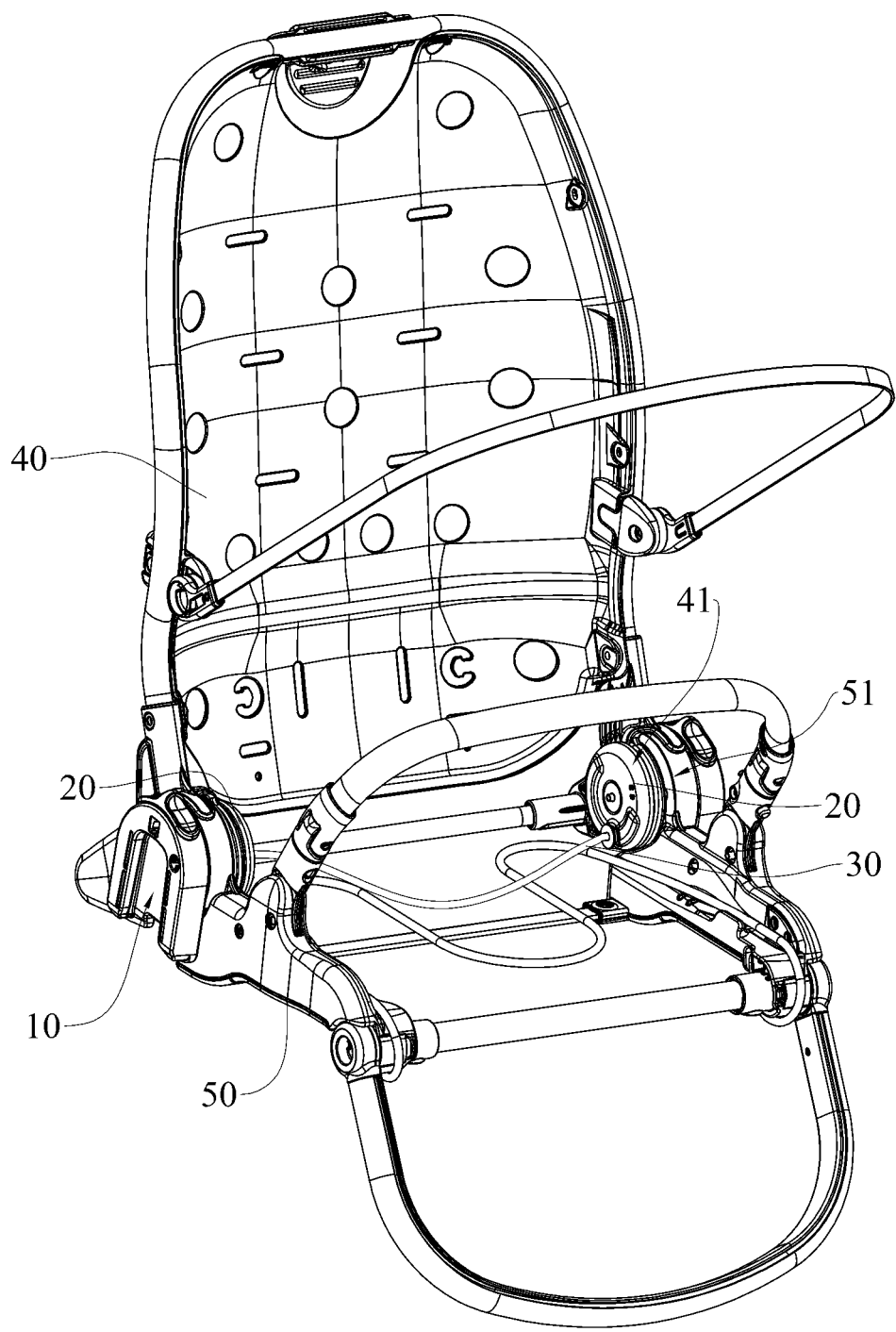
FIG. 2 is a structural schematic view of another angle according to FIG. 1.
Figure 3:
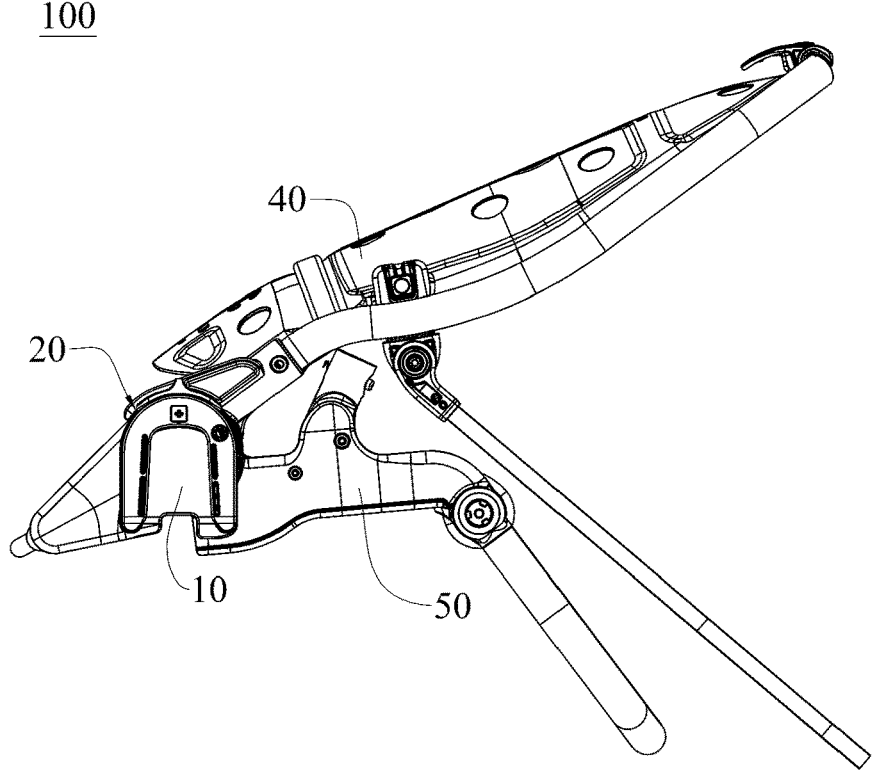
FIG. 3 is a structural schematic view of the seat portion in a folded configuration according to FIG. 1.
Figure 4:
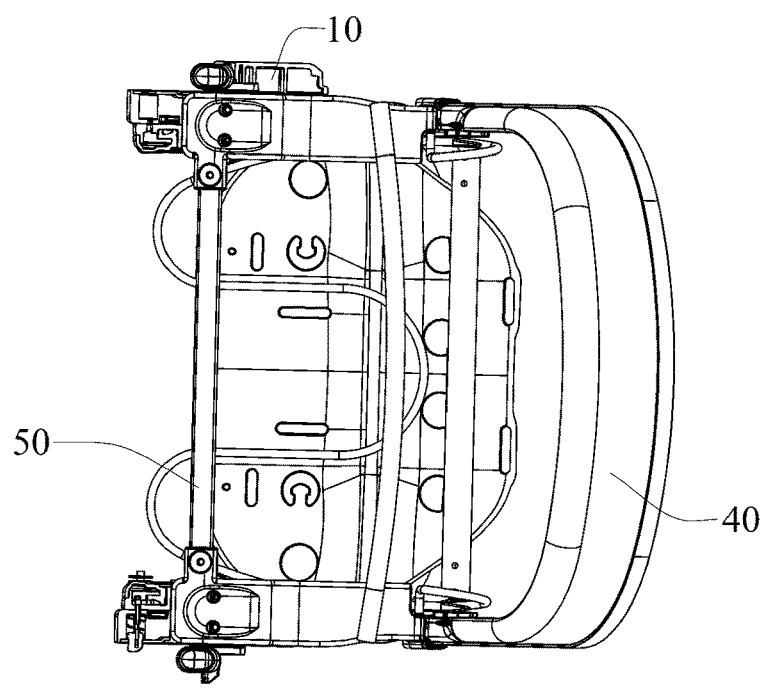
FIG. 4 is a structural schematic view of another angle according to FIG. 1.
Figure 5:
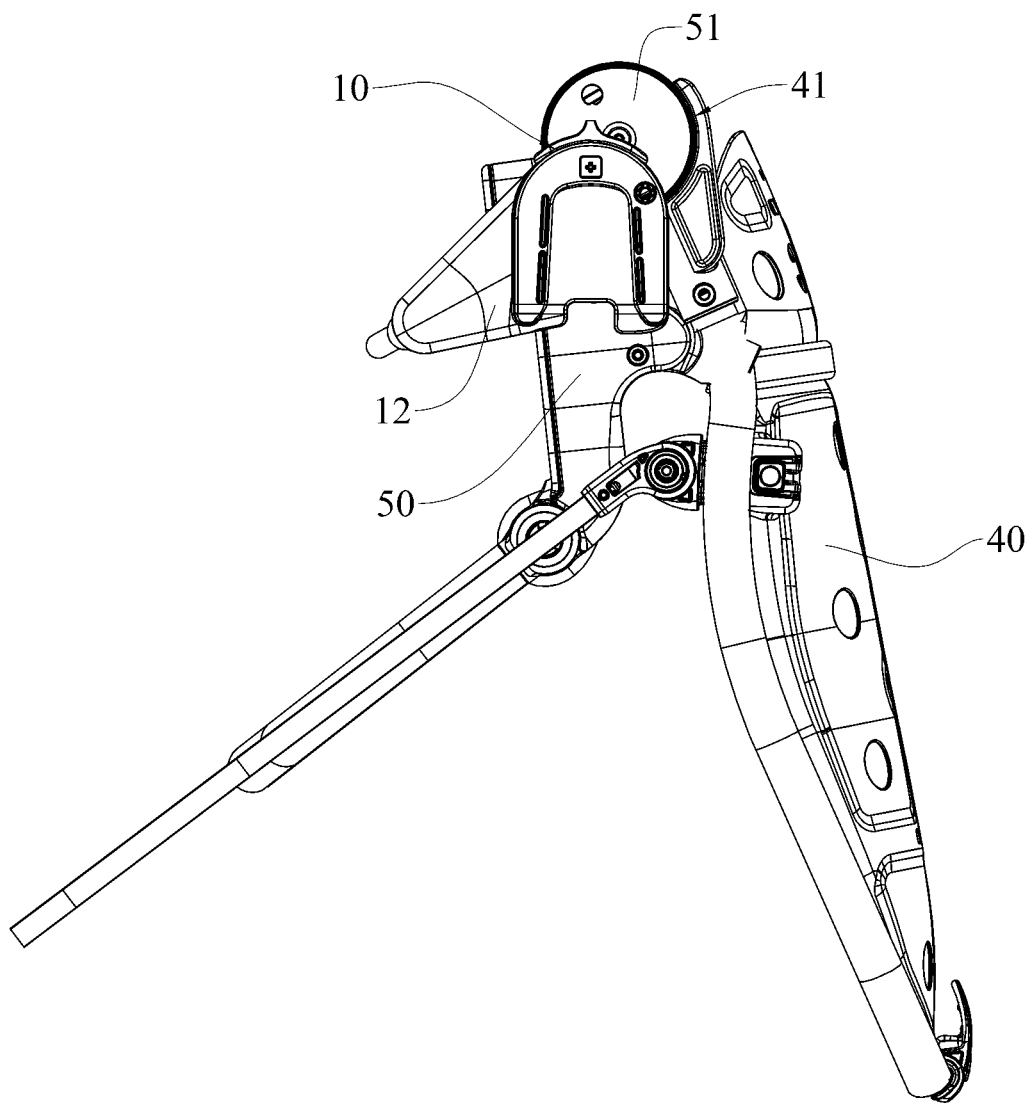
FIG. 5 is a structural schematic view of the seat portion in a folded configuration rotating to a specific angle according to FIG. 3.

To explain with more details the technology content and structural features of the present disclosure, further description is provided below with reference to the embodiments and accompanying drawings.

Referring to FIG. 1 to FIG. 5, the present disclosure provides a foldable child carrier 100 including a seat portion 50 pivotally connected to a stroller frame, and a back-resting portion 40 in a folded configuration relative to the seat portion 50, wherein a lock mechanism 10 is disposed between the seat portion 50 and the stroller frame. The lock mechanism 10 is to lock up the position of the seat portion 50 relative to the stroller frame. The seat portion 50 can be pivotally connected to the stroller frame via a second fixed base 51, and can be locked to the stroller frame via the lock mechanism 10, so that the seat portion 50 can be fixed on the stroller frame. When the lock mechanism 10 is released, the seat portion 50 can rotate along the pivotal point between the seat portion 50 and the stroller frame. Specifically, a movable actuator member 20 is disposed between the seat portion 50 and the back-resting portion 40. In the course of the folding of the back-resting portion 40, the first fixed base 41 rotates relative to the second fixed base 51, and the actuator member 20 rotates following the rotation of the first fixed base 41, i.e., the actuator member 20 rotates relative to the second fixed base 51. It is understandable that, when the back-resting portion 40 is reclined relative to the seat portion 50 or in the course of the folding of the back-resting portion 40, the actuator member 20 is unable to release the lock member 10. When the back-resting portion 40 is folded on the seat portion 50, the actuator member 20 can act on the lock mechanism 10, and movement of the actuator member 20 can allow the lock mechanism 10 to release the seat portion 50 and the stroller frame, so that the seat portion 50 can rotate relative to the stroller. The foldable child carrier 100 of the present disclosure is user-friendly and promises enhanced safety.

When the above-mentioned technology solutions is adopted, the foldable child carrier 100 of the present disclosure includes a stroller frame, a seat portion 50, and a back-resting portion 40 folded on the seat portion 50, wherein the seat portion 50 is pivotally connected to the stroller frame, and the back-resting portion 40 is foldable relative to the seat portion 50. A lock mechanism 10 is disposed between the seat portion 50 and the stroller frame, and an actuator member 20 to be used in the lock mechanism 10 is disposed between the back-resting portion 40 and the seat portion 50. When the back-resting portion is in a reclined state relative to the seat portion 50, the actuator member 20 is unable to release the lock member 10, and the seat portion 50 is unable to rotate relative to the stroller frame. When the back-resting portion 40 is in a folded position relative to the seat portion 50, the actuator member 20 can act on the lock mechanism 10, and movement of the actuator member 20 can trigger the lock mechanism 10 to release the seat portion 50, so that the seat portion 50 can rotate relative to the stroller frame. The foldable child carrier 100 of the present disclosure propels the actuator member 20 of the lock mechanism 10 to unlock the lock mechanism 10 only when the back-resting portion 40 is in a folded position, effectively preventing misusage of the child carrier, and making the child carrier more safe and reliable. The foldable child carrier 100 of the present disclosure can release the lock mechanism 10 via movement of the actuator member 20 when the back-resting portion is folded relative to the seat portion 50, so that the seat portion may be unlocked and released from the stroller frame, and eventually the seat portion 50 is rotatable relative to the stroller frame to adjust the position of the seat portion 50 relative to the stroller frame, allowing the child carrier to have a smaller size and easier portability and storage. The foldable child carrier 100 of the present disclosure has such features as novel structure, user-friendliness, safety and liability, and easy portability and storage.

Referring to FIG. 6 to FIG. 13, in some embodiments, the back-resting portion 40 is connected to the first fixed base 41, the seat portion 50 is connected to the second fixed portion, and the first fixed base 41 rotates relative to the second fixed base 41 when the back-resting portion 40 is folded, wherein, the actuator member 20 is disposed on the first fixed base 41, and it rotates following the rotation of the first fixed base 41, i.e., the actuator member 20 stays still relative to the first fixed base 41 in the course of the folding. Specifically, the actuator member 20 is connected to an operation member 30 to be used to propel the actuator member 20, and the operation member 30, being connected to the connection portion 22 of the actuator member 20, is disposed outside of the first fixed base 41 to facilitate operation of the user. The operation member 30 is of a flexible structure, and the operation member 30 of a flexible structure makes operation more comfortable and convenient. In addition, the operation member 30 of a flexible structure does not affect usage of the child carrier when it is in idle. In the present embodiment, when the back-resting portion 40 is folded on the seat portion 50, the actuator member 20 moves to a location where it can act on the lock mechanism 10 along with of the first fixed base 41, the operation member 30 disposed outside of the first fixed base 41 is pulled at the same time, so that the actuator member 20 rotates relative to the first fixed base 41, allowing the actuator member 20 to propel the lock mechanism 10 to release the lock.

Referring to FIG. 6 to FIG. 13, in some embodiments, the foldable child carrier 100 further includes a positioning member 12 that can be attached to or detached from the stroller frame, and the positioning member 12 can cooperate with the second fixed base 51 and the stroller frame, respectively, so that the seat portion 50 and the back-resting portion 40 installed on the seat portion 50 can be detachably installed on the stroller frame. The lock mechanism 10 includes a lock member 11 that is movably disposed on the second fixed base 51; the lock member 11 cooperates with the positioning member 12 to lock up the position of the seat portion 50 relative to the positioning member 12. When movement of the actuator member 20 acts on the lock member 11, the movement of actuator member 20 allows the lock member 11 to depart from the positioning member 12 and release the lock, so that the seat portion 50 can rotate relative to the stroller frame or the positioning member 12.

Figure 6:
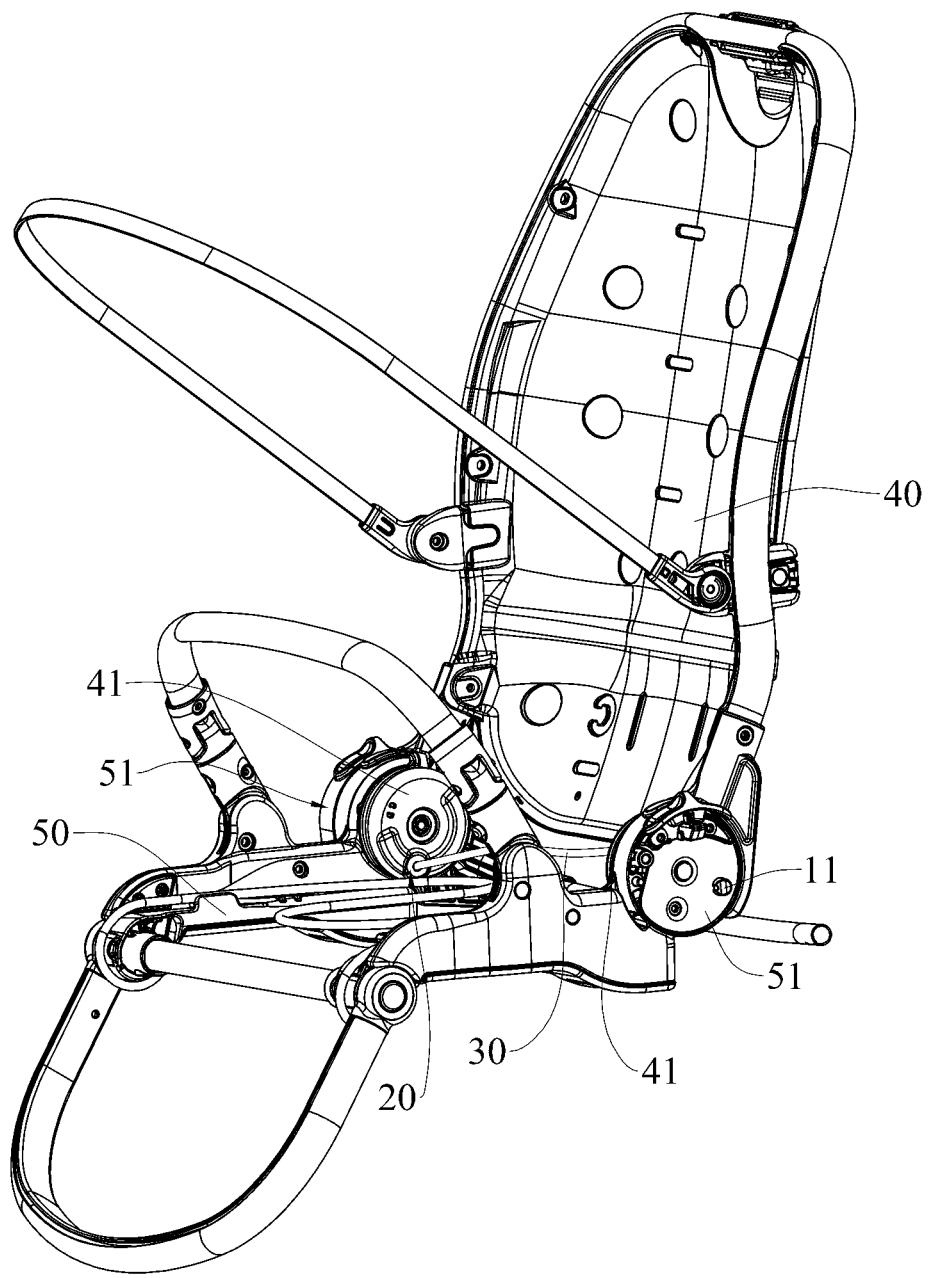
FIG. 6 is a structural schematic view of a portion devoid of the positioning member according to FIG. 1.
Figure 7:
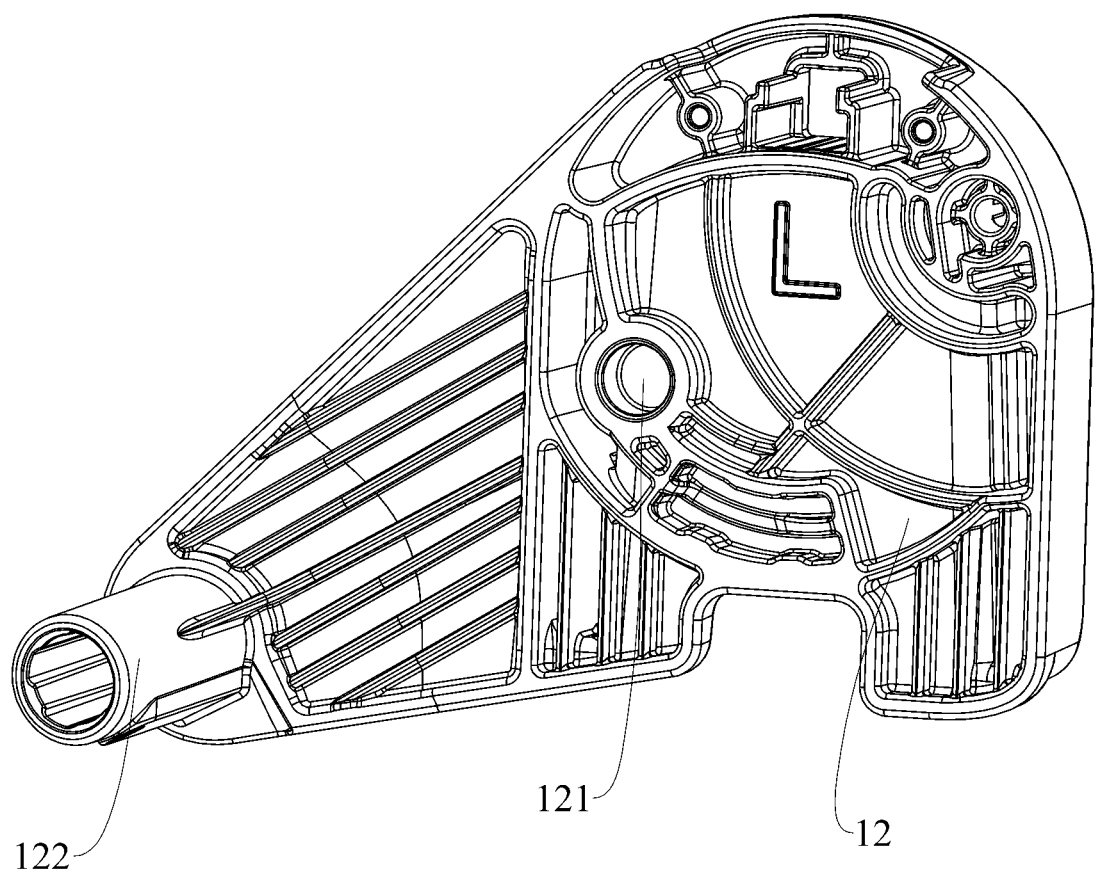
FIG. 7 is a structural schematic view of the positioning member according to FIG. 1.
Figure 8:
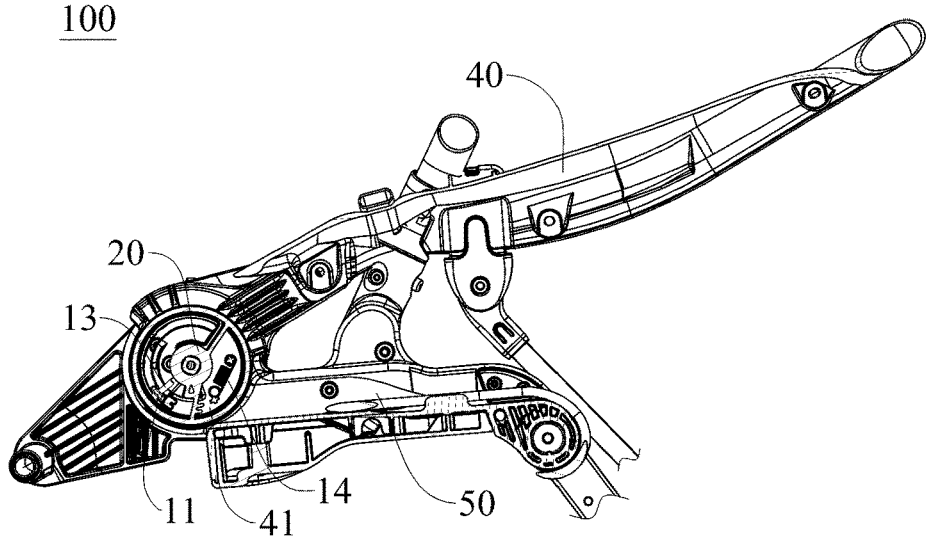
FIG. 8 is a structural schematic view of a seat portion in a folded position according to FIG. 6.
Figure 9:
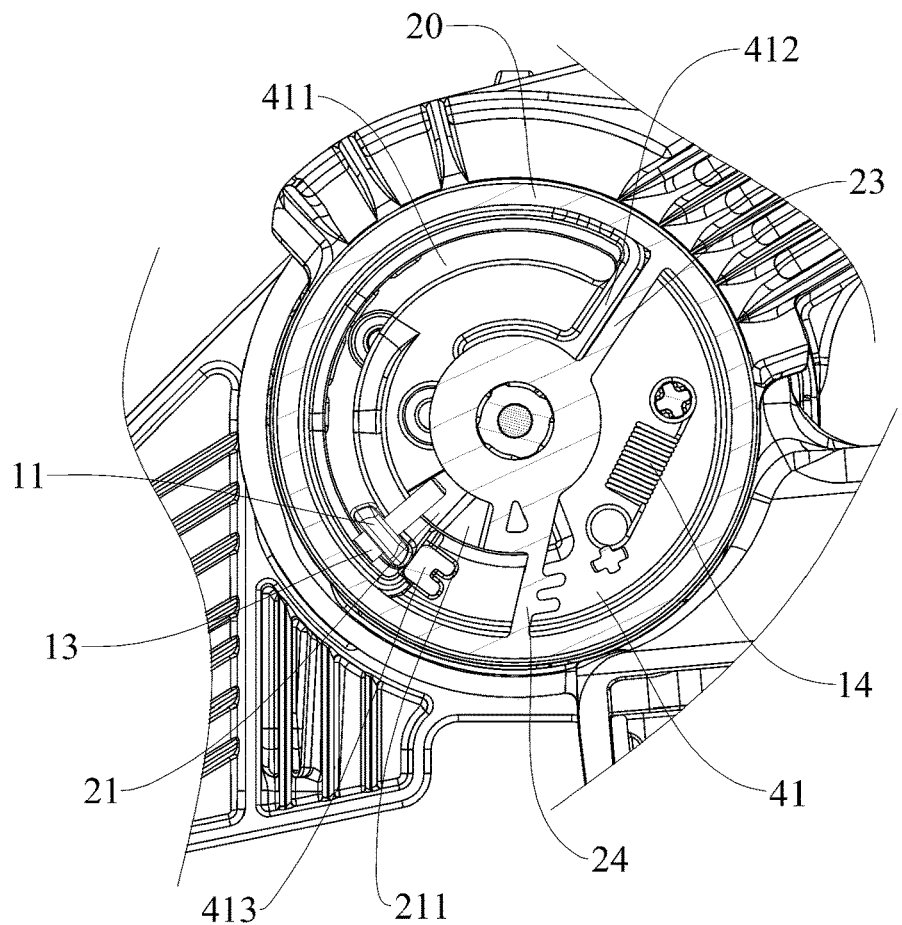
FIG. 9 is a partial structural schematic view of the foldable child carrier in a lock-up state according to FIG. 8.
Figure 10:
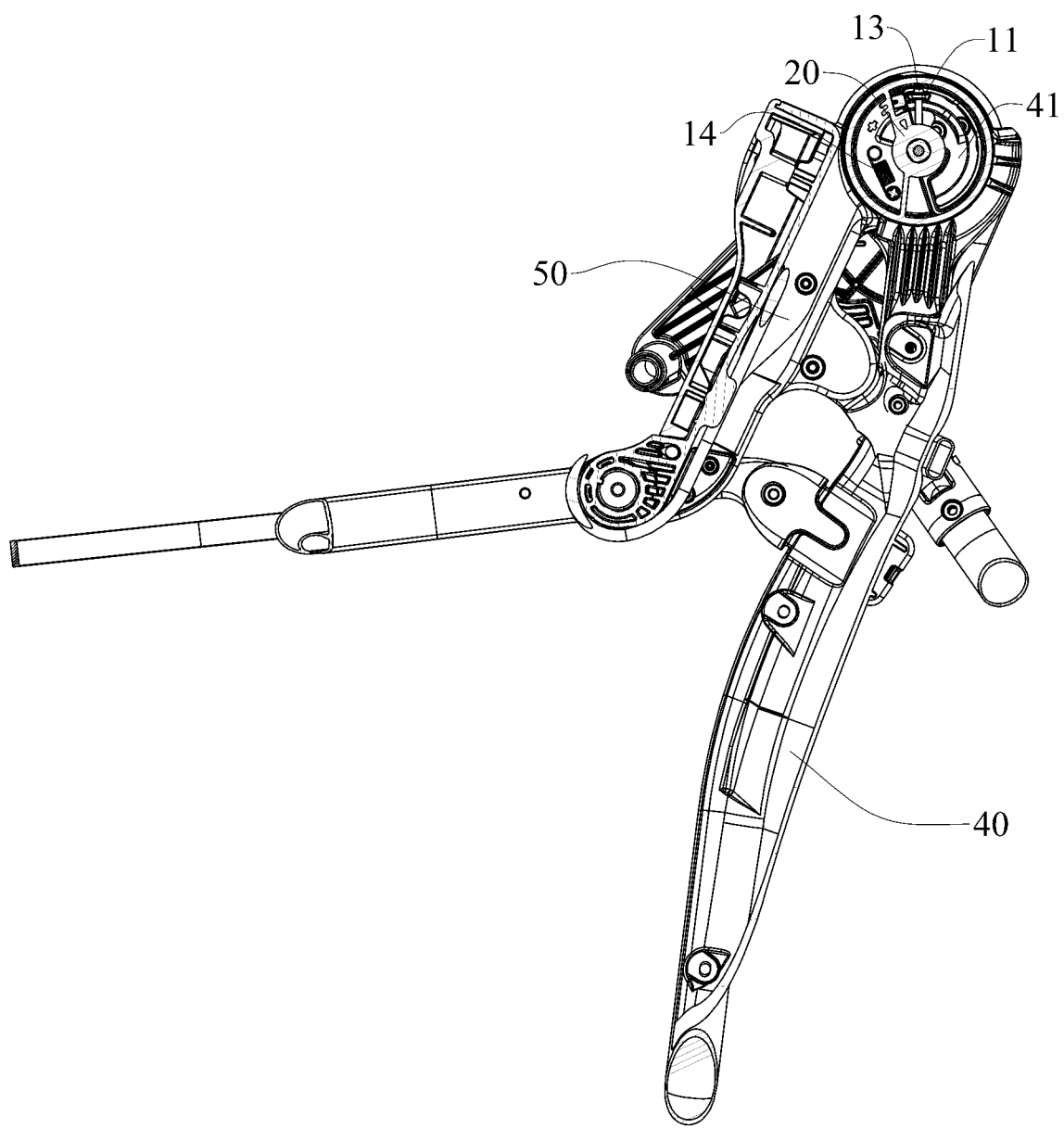
FIG. 10 is a structural schematic view of the seat portion in a folded position rotating to a specific angle according to FIG. 8.
Figure 11:
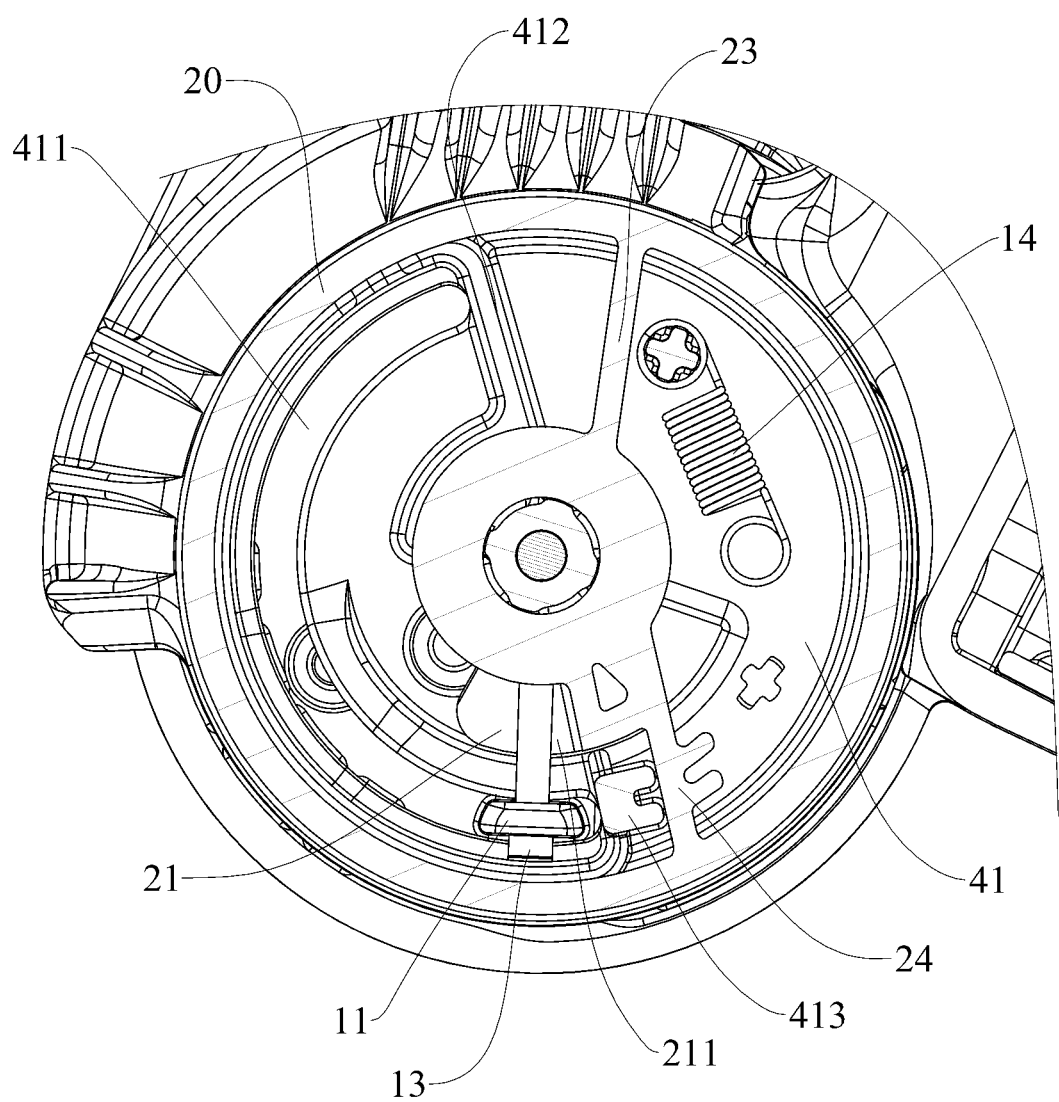
FIG. 11 is a partial structural schematic view of a foldable child carrier in an unlocked state according to FIG. 10.
Figure 12:
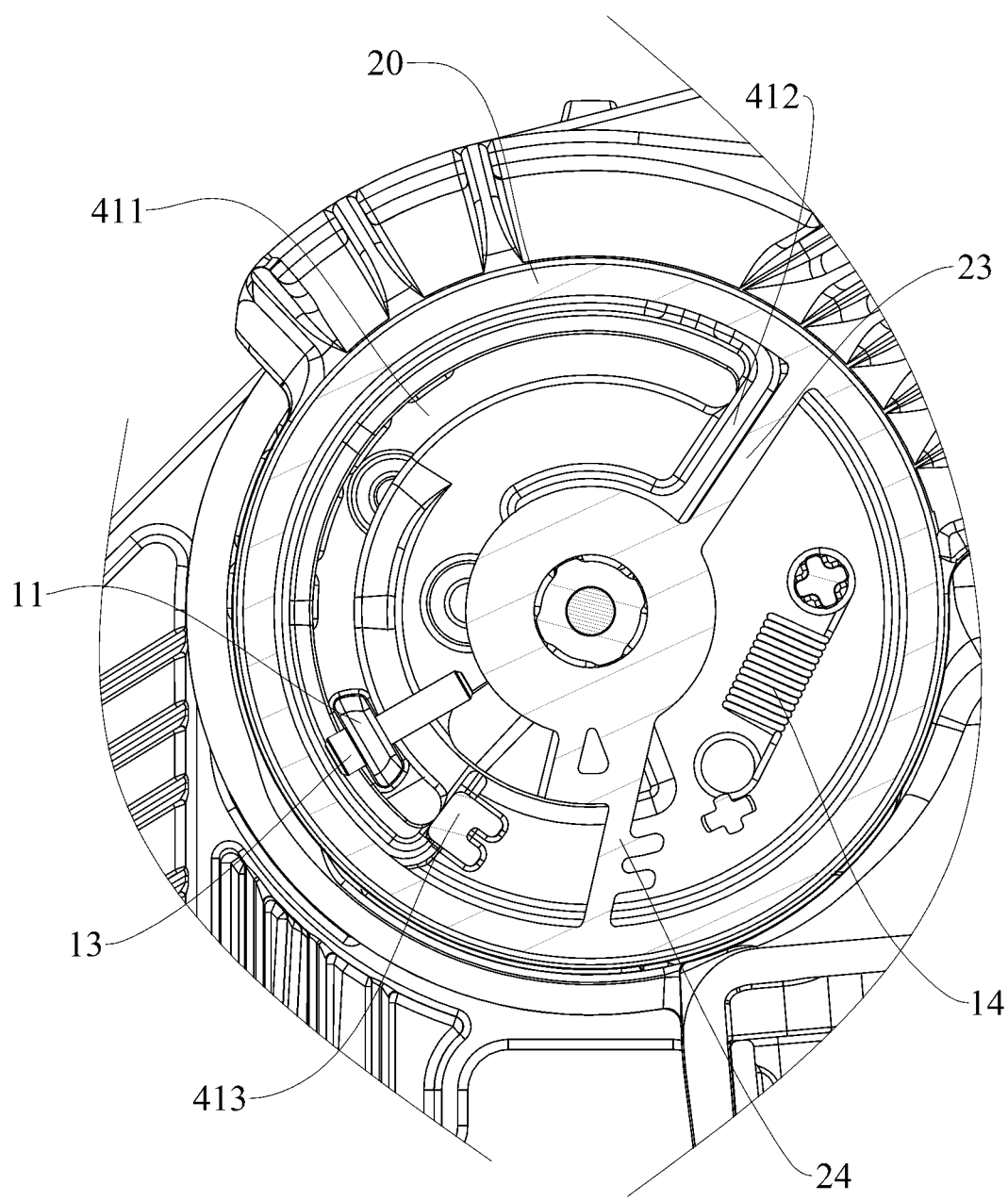
FIG. 12 is a structural schematic view of the seat portion that has not reached to the folded position and the actuator member is unable to act on the driving member.
Figure 13:
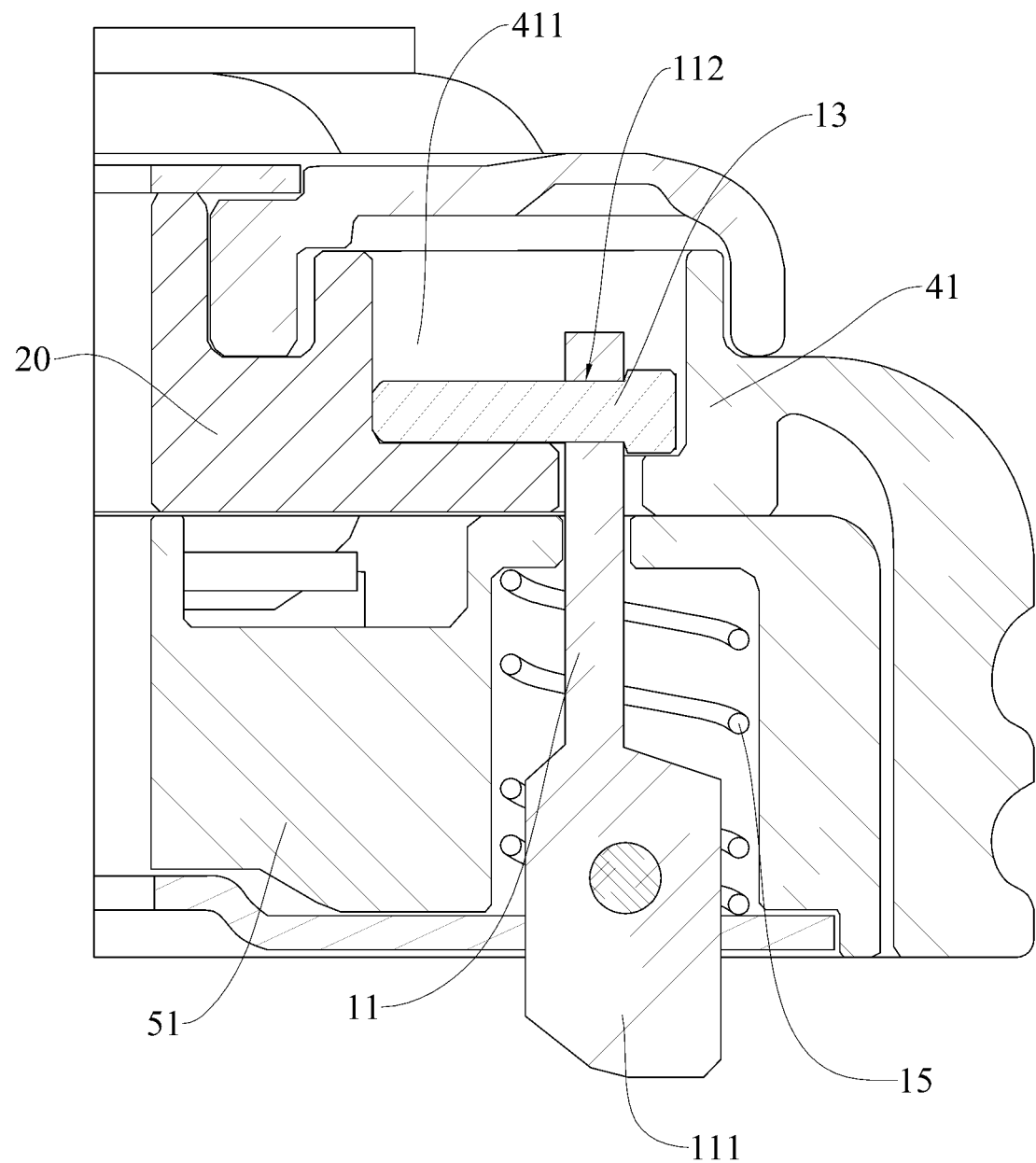
FIG. 13 is a side sectional view of the foldable child carrier according to FIG. 9.
Figure 14:
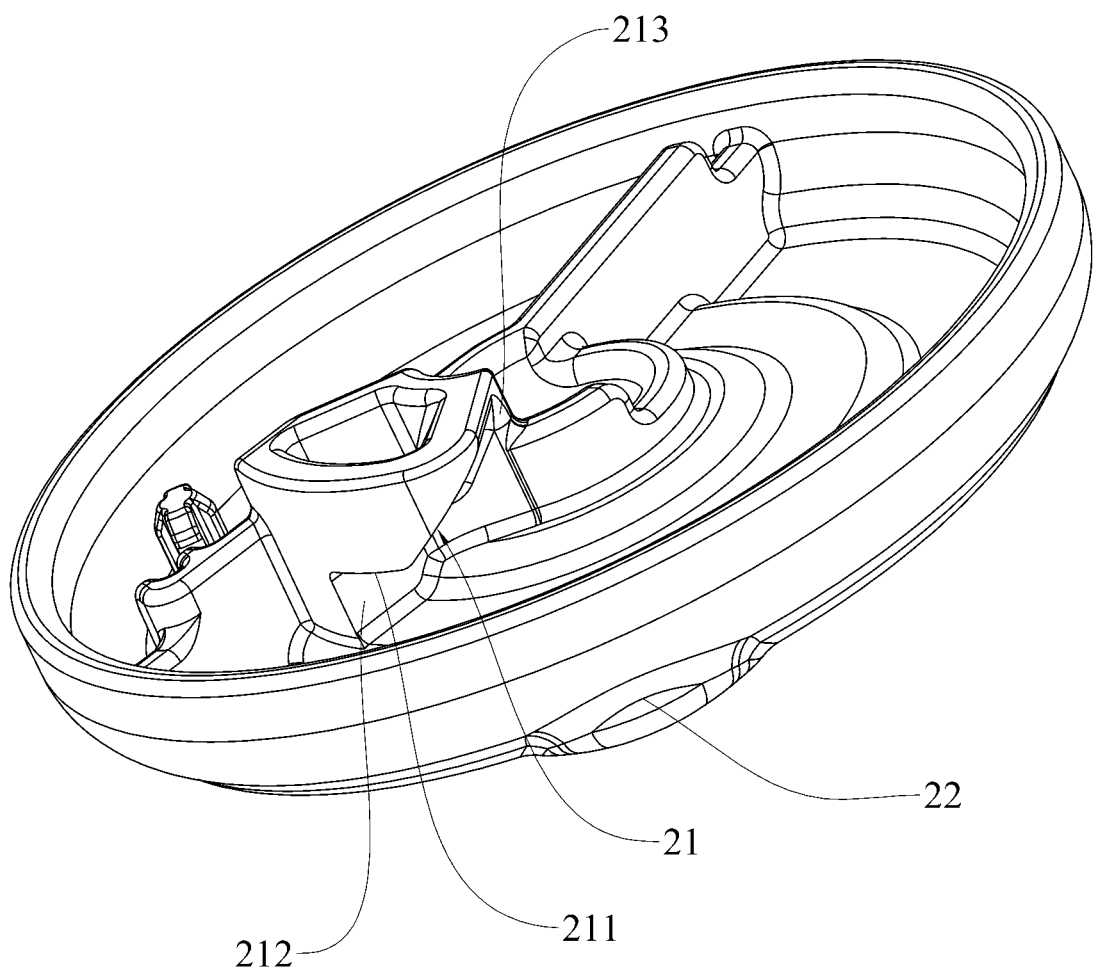
FIG. 14 is a structural schematic view of the actuator member according to FIG. 11.

Referring to FIG. 6, FIG. 7, and FIG. 13, in the present embodiment, an end further away from the driving member 13 of the lock member 11 is configured to have a lock portion 111 protruding from the second fixed base 51, and a positioning portion 121 cooperating with the lock portion 111 is disposed on the positioning member 12. When the lock portion 111 protrudes from the second fixed base 51 to cooperate with the positioning portion 121, the seat portion 50 is locked to the stroller frame. When the actuator member 20 is in contact with the driving member 13 and moves, the driving member 13 can trigger the lock portion 111 to withdraw into the second fixed base 51 so that the lock portion 111 departs from the positioning portion 121 to release the lock, allowing the seat portion 50 to rotate relative to the stroller frame or the positioning member 12.

Referring to FIG. 6 to FIG. 13, in some embodiments, a driving member 13 is disposed between the actuator member 20 and the lock member 11, and the actuator member 20 can act on the lock member 11 via the driving member 13. The actuator member 20 is rotatably disposed on the first fixed base 41, and the lock member 11 is retractably disposed on the second fixed portion 51, and an arch-shaped slot 411 is disposed on the first fixed base 41 for penetrating through the lock member 11, and the lock member 11 is at a different location of the arch-shaped slot when the first fixed base 41 rotates relative to the second fixed base 51. It is understandable that, in the course of the folding of the back-resting portion 40, the actuator member 20 rotates along with the first fixed base 41, the lock member 11 stays still along with the second fixed portion 51, and the actuator member 20 rotates relative to the lock member 11 at the same time. The configuration of the penetrable arch-shaped slot 411 can prevent the lock member 11 from intervening the rotation of the first fixed portion 41 and the actuator member 20. Specifically, the driving member 13 is connected to the lock member 11 and disposed on the moving path of the actuator member 20. When the actuator member 20 rotates to contact with the driving member 13, the actuator member 20 is allowed to rotate relative to the first fixed base 41 and act on the driving member 13 via the operation on the operation member 30, propelling the driving member 13 to trigger movement of the lock member 11. The driving member 13 is movably disposed between the first disposed base 41 and the actuator member 20, and it can move along the transverse direction of the first fixed base 41 and the actuator member 20, so as to trigger retractable movement of the lock member 11.

Referring to FIG. 8 to FIG. 14, in some embodiments, an actuator portion cooperating with the driving member 13 is disposed on the actuator member 20, and the driving member 13 is disposed on the moving path of the actuator portion. Specifically, the actuator portion is an actuating inclined surface 21, and the actuator member 20 may act to propel the actuating inclined surface to jack up the driving member 13, so that the driving member 13 may trigger the lock member 11 to move and depart from the lock position. Optionally, one end of the actuating inclined surface 21 is configured to have a flat straight portion 211 for the driving member 13 to stay, and when the driving member 13 is jacked up to the flat straight portion 211 by the actuating inclined surface 21, displacement of the lock member 11 is sufficient for the lock member to depart from the lock position and release the lock. Given the inclined configuration of the actuating inclined surface 21, the driving member 13 on the actuating inclined surface 21 may have an inclination to go downward, and the flat straight portion 211 is disposed on a peak point of the actuating inclined surface 21, so that the driving member 13 may stay on the actuating inclined surface 21 more stably, allowing the lock member 11 to depart from the positioning member 12 in a better way.

Referring to FIG. 8 to FIG. 12, in some embodiments, a first restraint member 412 to restrict rotation of the actuator member 20 in the first direction is disposed on the first fixed base 41, and a first restraint portion 23 corresponding to the first restraint member 412 is disposed on the actuator member 20. A second restraint member 413 to restrict rotation of the actuator member 20 in the second direction is disposed on the first fixed base 41, and a second restraint portion 24 corresponding to the second restraint member 413 is disposed on the actuator member 20. Wherein, the first direction is the anticlockwise direction in which the actuator member 20 rotates relative to the first fixed base 41. The second direction is the clockwise direction in which the actuator member 20 rotates relative to the first fixed base 41. It is understandable that, the operation member 30 pulls the actuator member 20 to rotate between the first restraint member 412 and the second restraint member 413. When the first restraint portion 23 abuts against the first restraint member 412, the lock mechanism 10 is in a locked state. When the second restraint portion abuts against the second restraint member 413, the lock mechanism is in an unlocked state.

Referring to FIG. 8 to FIG. 13, one end of the lock member 11 is retractably installed on the second fixed base 51, and the other end of the lock member 11 protrudes out of an arch-shaped slot 411, and an installation portion 112 that cooperates with the driving member 13 is disposed thereon. Specifically, the installation portion 112 is a through hole for installation of the driving member 13 therein. The installation portion 112 can also serve as an engagement portion to engage with the driving member 13, so long as the lock member 11 and the driving member 13 are connected together, and concurrently allowing the driving member 13 to trigger movement of the lock member 11, with which the present disclosure has no specific restriction. On the other hand, a second return member 15 that keeps the lock member 11 in a constantly returning state is disposed on the lock member 11. After the actuator member 20 rotates and returns, to avoid the driving member 13 being stuck between the fixed base 41 and the actuating inclined surface 21, the second return member 15 to trigger the return of the lock member 11 is disposed on the lock member 11, so that the lock member 11 is kept constantly locked with the positioning member 12. Specifically, the second return member 15 is of a tension spring structure, and the second return member 15 can be any other elastic structure that can be pressed and released.

Referring to FIG. 8 to FIG. 14, in certain embodiments, a first return member 14 to keep the actuator member 20 in a constantly returning state is disposed on first fixed base 41. Specifically, the first return member 14 is a tension spring. The actuator member 20 triggers the tension spring to deform with force when the actuator member 20 rotates along the first fixed base 41. When the force acting on the actuator member 20 is withdrawn, the tension spring will trigger the actuator member 20 to return. In the present embodiment, the outer perimeter of the actuator member 20 is a round-shaped structure to rotate and cooperate with the first fixed base 41. The actuator member 20 is connected to the first fixed base 41 on the back-resting portion 40; when the back-resting portion 40 is reclined relative to the seat portion 50, or in the course of folding the back-resting portion 40 relative to the seating portion 50, the actuating inclined surface 21 on the actuator member 20 is at a location away from the driving member 13, and operation on the operation member 30 is unable to make the actuating inclined surface 21 to act on the driving member 13. When the back-resting portion 40 is in a folded position relative to the seat portion 50, the actuator member 20 rotates with the first fixed base 41 to a location where the actuating inclined surface 21 can propel the driving member 13, and concurrent operation on the operation member 30 can allow the actuator member 20 to rotate relative to the first fixed base 41. The rotation of the actuator member 20 propels the actuating inclined surface 21 to act on the driving member 13 so as to trigger the lock member 11 to depart from the positioning member 12, allowing the seat portion 50 of the folded back-resting portion 40 to rotate relative to the stroller frame to adjust the position of the seat portion 50 relative to the back-resting portion 40 relative to the position of the stroller frame, and further allowing the child carrier to have a smaller size and easier portability and storage after the folding.

Referring to FIG. 1 to FIG. 14, the foldable child carrier 100 of the present disclosure includes a stroller frame, a seat portion 50, and a back-resting portion 40 folded on the seat portion, wherein the seat portion 50 is pivotally connected to the stroller frame, and the back-resting portion 40 is foldable relative to the seat portion 50. A lock mechanism 10 is disposed between the seat portion 50 and the stroller frame, and the lock mechanism 10 can lock the seat portion 50 to the stroller frame; and the seat portion 50 can rotate relative to the stroller frame when the lock mechanism 10 is released. An actuator member 20 to propel the lock mechanism 10 is disposed between the back-resting portion 40 and the seat portion 50. When the back-resting portion 40 is in a reclined state relative to the seat portion 50, or in the course of folding the back-resting portion 40, the actuator member 20 is unable to unlock and release the lock member 10, and the lock mechanism 10 is in a locked state, so the seat portion 50 is unable to rotate relative to the stroller frame. When the back-resting portion 40 is folded relative to the seat portion 50, the actuator member 20 rotates along with the first fixed base 41 to be close to the driving member 13, and meanwhile, movement of the actuator member 20 can trigger the lock mechanism to release the lock, so that the seat portion 50 can rotate relative to the stroller frame. The foldable child carrier 100 of the present disclosure propels the actuator member 20 of the lock mechanism 10 to act on the lock mechanism 10 only when the back-resting portion 40 is in a folded position, effectively preventing misusage of the child carrier, and making the child carrier more safe and reliable. The foldable child carrier 100 of the present disclosure can release the lock mechanism 10 via movement of the actuator member 20 when the back-resting portion 40 is folded relative to the seat portion 50, so that the seat portion 50 can be unlocked and released from the stroller frame, and eventually the seat portion 50 can rotate relative to the stroller frame to adjust the position of the seat portion 50 relative to the stroller frame, allowing the child carrier to have a smaller size and easier portability and storage. The foldable child carrier 100 of the present disclosure has such features as novel structure, user-friendliness, safety and liability, and easy portability and storage.

The disclosures above merely refer to preferable embodiments of the present disclosure, and shall not be construed as limitations to the scope of the claimed disclosure. Therefore, equivalent variations made in accordance with the claims of this disclosure shall fall within the scope of the claimed disclosure.

What is claimed is:

1. A foldable child carrier, comprising:
a seat portion pivotally connected to a stroller frame and a back-resting portion;
a lock mechanism disposed between the seat portion and the stroller frame to lock a position of the back-resting portion relative to the stroller frame; and
an actuator member movably disposed between the seat portion and the back-resting portion;
wherein the actuator member is unable to release the lock mechanism when the back-resting portion is in a reclined position;
wherein the actuator member is moved to cause the lock mechanism to release the seat portion and the stroller frame when the back-resting portion is in a folded position, allowing the seat portion to rotate relative to the stroller frame; and wherein the back-resting portion is connected to a first fixed base, and the seat portion is connected to a second fixed base; and the first fixed base is rotatable relative to the second fixed base when the back-resting portion is folded.

2. The foldable child carrier according to claim 1, wherein the actuator member is installed on the first fixed base.

3. The foldable child carrier according to claim 1, wherein the actuator member is rotatably disposed on the first fixed base.

4. The foldable child carrier according to claim 1, wherein the lock mechanism comprises a lock member movably disposed on the second fixed base.

5. The foldable child carrier according to claim 4, further comprising a positioning member cooperating with the stroller frame to cause the seat portion to engage with the stroller frame, wherein the lock member cooperates with the positioning member to lock the position of the seat portion relative to the positioning member, and wherein the actuator member is moved to release the lock member from the positioning member, allowing the seat portion to rotate relative to the stroller frame or the positioning member.

6. The foldable child carrier according to claim 4, wherein a driving member is disposed between the actuator member and the lock member, and the driving member is connected to the lock member and disposed on a moving path of the actuator member, which is moved to cause the driving member to trigger movement of the lock member.

7. The foldable child carrier according to claim 6, wherein the driving member is movably disposed between the first fixed base and the actuator member.

8. The foldable child carrier according to claim 6, wherein the actuator member is provided with an actuator portion cooperating with the driving member, wherein the driving member is disposed on the moving path of the actuator portion.

9. The foldable child carrier according to claim 8, wherein the actuator portion is an actuating inclined surface, and the actuator member is moved to cause the driving member to be jacked up by the actuating inclined surface, allowing the driving member to cause the lock member to move and depart from the lock position.

10. The foldable child carrier according to claim 9, wherein one end of the actuating inclined surface is formed with a flat straight portion for the driving member to stay, and when the driving member is jacked up to the flat straight portion by the actuating inclined surface, the lock member is displaceable to an extent sufficient for the lock member to depart from the lock position and release the lock.

11. The foldable child carrier according to claim 6, wherein an installation portion cooperating with the driving member is disposed on the lock member.

12. The foldable child carrier according to claim 11, wherein the installation portion is a through hole for installation of the driving member therein.

13. The foldable child carrier according to claim 6, wherein the lock member has a lock portion, protruding from the second fixed base, formed on an end away from the driving member, and a positioning member has a positioning portion disposed thereon for cooperating with the lock portion.

14. The foldable child carrier according to claim 4, wherein the first fixed base has an arch-shaped slot formed thereon for the lock member to pass through, and the lock member is at a different location of the arch-shaped slot when the first fixed base is rotated relative to the second fixed base.

15. The foldable child carrier according to claim 4, wherein a second return member to keep the lock member in a constantly returning state is disposed on the lock member.

16. The foldable child carrier according to claim 15, wherein the second return member is of a spring structure.

17. The foldable child carrier according to claim 1, wherein a first restraint member to restrict rotation of the actuator member in a first direction is disposed on the first fixed base, and a first restraint portion corresponding to the first restraint member is disposed on the actuator member.

18. The foldable child carrier according to claim 1, wherein a second restraint member to restrict rotation of the actuator member in a second direction is disposed on the first fixed base, and a second restraint portion corresponding to the second restraint member is disposed on the actuator member.

19. The foldable child carrier according to claim 1, wherein a first return member to keep the actuator member in a consistently returning state is disposed on the actuator member.

20. The foldable child carrier according to claim 19, wherein the first return member is a tension spring.

21. The foldable child carrier according to claim 1, wherein the actuator member includes an operation member connected thereto to propel the actuator member.

22. The foldable child carrier according to claim 21, wherein the operation member is of a flexible structure.

* * * * *